(12) United States Patent
Stopic et al.

(10) Patent No.: US 10,572,880 B2
(45) Date of Patent: Feb. 25, 2020

(54) INTEGRATED MERCHANT PURCHASE INQUIRY AND DISPUTE RESOLUTION SYSTEM

(71) Applicant: Visa International Service Association, San Francisco, CA (US)

(72) Inventors: Richard Stopic, Singapore (SG); David Richey, Hayward, CA (US); Elizabeth Chaffin, Tracy, CA (US); Mark Woelfer, Aliso Viejo, CA (US); Stacey Jess, Byron, CA (US)

(73) Assignee: Visa International Service Association, San Francisco, CA (US)

( * ) Notice: Subject to any disclaimer, the term of this patent is extended or adjusted under 35 U.S.C. 154(b) by 894 days.

(21) Appl. No.: 14/814,188

(22) Filed: Jul. 30, 2015

(65) Prior Publication Data
US 2016/0034906 A1    Feb. 4, 2016

Related U.S. Application Data

(60) Provisional application No. 62/031,129, filed on Jul. 30, 2014.

(51) Int. Cl.
*G06Q 30/00* (2012.01)
*G06Q 40/00* (2012.01)

(52) U.S. Cl.
CPC .......... *G06Q 30/016* (2013.01); *G06Q 40/12* (2013.12)

(58) Field of Classification Search
None
See application file for complete search history.

(56) References Cited

U.S. PATENT DOCUMENTS

| 7,356,516 | B2 | 4/2008 | Richey et al. | |
|---|---|---|---|---|
| 8,566,235 | B2 | 10/2013 | Katz et al. | |
| 2002/0141561 | A1* | 10/2002 | Duncan | H04L 51/04 379/220.01 |
| 2004/0128155 | A1* | 7/2004 | Vaidyanathan | G06Q 10/10 705/309 |
| 2005/0178824 | A1* | 8/2005 | Benson | G06Q 10/10 235/380 |
| 2009/0030710 | A1 | 1/2009 | Levine | |

(Continued)

*Primary Examiner* — Fateh M Obaid
(74) *Attorney, Agent, or Firm* — Kilpatrick Townsend & Stockton LLP

(57) ABSTRACT

When an account holder contacts the issuer of the account to dispute a transaction conducted with a merchant using the account, the issuer may request additional transaction details, such as purchased item level details, from the merchant via the merchant integrated dispute resolution platform. A real-time purchase inquiry sent to the merchant may request purchase information or transaction information (e.g. purchased item details, order information, order history, shipping and delivery information, etc.) associated with the transaction. The merchant may send a real-time response to the merchant integrated dispute resolution platform which may forward all or a portion of the received information to the issuer in real-time. The entire communication between the issuer, the merchant integrated dispute resolution platform and the merchant may be a sessionless (or stateless) communication, i.e. all communication among the parties may occur in a single session which may last 10 seconds or less.

16 Claims, 11 Drawing Sheets

(56) References Cited

U.S. PATENT DOCUMENTS

| | | | | |
|---|---|---|---|---|
| 2010/0145810 A1* | 6/2010 | Pourfallah | ............ | G06Q 20/12 |
| | | | | 705/17 |
| 2010/0161457 A1* | 6/2010 | Katz | ..................... | G06Q 20/10 |
| | | | | 705/30 |
| 2011/0196791 A1* | 8/2011 | Dominguez | ........... | G06Q 20/40 |
| | | | | 705/44 |
| 2011/0276475 A1* | 11/2011 | Godejohn | ............. | G06Q 20/10 |
| | | | | 705/39 |
| 2012/0284175 A1* | 11/2012 | Wilson | ................... | G06Q 20/10 |
| | | | | 705/39 |
| 2013/0080318 A1* | 3/2013 | Katz | ..................... | G06Q 40/00 |
| | | | | 705/39 |
| 2013/0132231 A1* | 5/2013 | Teudt | .................... | G06Q 30/06 |
| | | | | 705/26.8 |
| 2013/0218721 A1* | 8/2013 | Borhan | ............... | G06Q 20/322 |
| | | | | 705/26.41 |
| 2014/0310160 A1* | 10/2014 | Kumar | .............. | G06Q 20/4016 |
| | | | | 705/39 |
| 2015/0012426 A1* | 1/2015 | Purves | .............. | G06Q 30/0623 |
| | | | | 705/41 |
| 2015/0186888 A1* | 7/2015 | Katz | ................. | G06Q 20/4016 |
| | | | | 705/39 |
| 2016/0034906 A1* | 2/2016 | Stopic | ................. | G06Q 30/016 |
| | | | | 705/30 |
| 2016/0300214 A1* | 10/2016 | Chaffin | ................. | G06Q 20/22 |
| 2017/0300881 A1* | 10/2017 | Weinflash | ............ | G06Q 20/102 |

* cited by examiner

INTEGRATED MERCHANT PURCHASE INQUIRY AND DISPUTE RESOLUTION SYSTEM

RELATED APPLICATIONS

This application claims the benefit of and priority to U.S. Provisional Application No. 62/031,129, filed Jul. 30, 2014 and entitled "INTEGRATED MERCHANT PURCHASE INQUIRY," the entire disclosure of which is incorporated herein by reference for all purposes.

BACKGROUND

Customers increasingly contact their issuing banks, or credit card companies, to dispute transactions. For example, if goods or services have not been delivered or provided as promised, when experiencing buyer's remorse, or when a charge is not recognized. Currently, when a consumer disputes a transaction, a 45 to 90 day dispute resolution process is invoked which forces acquirers and merchants to prove that the disputed charge is valid. This is a time consuming and costly process that generally provides a poor experience for all involved.

In addition, current dispute resolution systems do not allow issuers and merchants/acquirers to notify each other about the remedial actions taken by each of these parties. Accordingly, it is possible for an account holder to get refunded twice: once from the merchant and once from the issuer. Even though systems may be in place to detect the dual-refund after the refunds are complete, the reverting one of the refunds is a time consuming and burdensome process.

Embodiments of the invention address these problems and other problems individually and collectively.

SUMMARY

Embodiments of the present invention are directed to a merchant integrated dispute resolution system that enables merchants to integrate with a dispute resolution system. Integration may be accomplished by registering the merchants with the dispute resolution system. During registration, a merchant configuration is associated with each merchant. The merchant configuration may indicate an address or a location (e.g. Uniform Resource Locator (URL)) to be used by the merchant integrated dispute resolution platform to call the merchant, and credentials (e.g. username, password and security certificates) for accessing the address. The URL may be unique for each merchant (e.g. merchant-specific). In addition, during registration, the merchant integrated dispute resolution platform may provide an Application Programming Interface (API) to the merchant. The API may be the same for all merchants. That is, the API may be specific to the merchant integrated dispute resolution platform. The API may define how the merchant integrated dispute resolution system and the merchants (e.g. merchant systems or merchant computers) communicate with one another.

When an account holder contacts their issuer (e.g. a financial entity, such as a bank, that issued the account to the account holder) to dispute a transaction conducted with a merchant, a call center employee or an online banking portal of the issuer can send a real-time transaction inquiry to the merchant integrated dispute resolution platform to obtain transaction information (order information, order history, shipping and delivery information, etc.) and merchant instructions from the merchant. The transaction information obtained from the merchant may include details related to the item (e.g. goods or services) purchased from the merchant. Such information is not accessible to the conventional dispute resolution systems.

Based on the transaction information and the merchant instructions received from the merchant, the formal dispute resolution process may be avoided. For example, if a customer claims to have not received the item, the merchant integrated dispute resolution platform may present evidence of delivery obtained directly from the merchant. Similarly, if a high value customer is disputing a small value transaction, merchant instructions may automatically provide the customer with a voucher/store credit. This is particularly useful in online purchases, such as music or movie purchases, where the amount in dispute is typically very small. This further allows payment processors to monitor the dispute resolution process, to prevent customers from making a claim to the merchant and then making a separate claim to the payment processor or issuer, and receiving a refund twice for the same transaction.

One embodiment is directed to a method performed by a merchant integrated dispute resolution platform. The method includes receiving a transaction inquiry message for a transaction from an issuer. The transaction inquiry message includes transaction information received from an account holder. Receiving the transaction inquiry message starts a communication session. The method further includes analyzing the plurality of transaction information to identify a merchant associated with the transaction and identifying the merchant associated with the transaction based on the analyzing. The merchant integrated dispute resolution platform generates a real-time purchase inquiry message and establishes a secure communication channel with the merchant. The real-time purchase inquiry message is sent to the merchant (or merchant's nominated payment service provider, processor or aggregator) via the secure communication channel. The method also includes receiving a real-time response from the merchant as part of the communication session. The real-time response includes purchase details associated with the transaction. In some embodiments, the communication session takes 10 seconds or less.

In some embodiments, the real-time purchase inquiry message is sent to the merchant (or merchant's nominated payment service provider, processor or aggregator) through an application programming interface (API). The real-time response may include dispute resolution instructions. The transaction information in the transaction inquiry message may be received from an account holder of an account used for payment for the transaction. The purchase details may include delivery information.

According to some embodiments, the method may further include formatting the real-time purchase inquiry message according to a schema prior to sending the real-time purchase inquiry to the merchant. The method may also include formatting the real-time response according to a schema, the formatted real-time response including dispute resolution actions taken by the merchant; and sending the formatted real-time response to the issuer.

According to various embodiments, the identifying step further includes determining a merchant identifier among the transaction information based on the analyzing, searching a registered merchant database storing identifying information about a plurality of merchants registered with the dispute resolution platform, determining a match for the merchant identifier in the registered merchant database, retrieving credentials associated with the merchant based on the match, and establishing the secure communication channel with the merchant by providing the credentials.

In some embodiments, the method may also include, after receiving the real-time response from the merchant, receiving a notification from the issuer identifying the transaction as a fraudulent transaction; generating a real-time fraudulent transaction notification; sending the fraudulent transaction notification to the merchant; and receiving a real-time response from the merchant as part of the communication session. The real-time response may indicate steps taken by the merchant in connection with the fraudulent transaction.

In some embodiments, the method may also include, after receiving the real-time response from the merchant, receiving a real-time notification from the issuer indicating account holder intent to dispute the transaction; generating a real-time dispute intent notification; sending the real-time dispute intent notification to the merchant; and receiving a real-time response from the merchant as part of the communication session. The real-time response may indicate dispute resolution options.

In some embodiments, the method may also include, after receiving the real-time response from the merchant, receiving a real-time notification from the issuer identifying the transaction as an exception event; generating a real-time exception event notification; sending the real-time exception event notification to the merchant; and receiving a real-time response from the merchant as part of the communication session. The real-time response may indicate steps taken by the merchant in connection with the exception event notification. The real-time exception event notification includes one or more of an exception file listing including a list of payment account numbers that have been compromised, an instruction to stop recurring payments and updated payment account details.

Another embodiment is directed to a method performed by a merchant computer. The method includes receiving a transaction inquiry message for a transaction from an account holder device. The transaction inquiry message includes a plurality of transaction information. The transaction is between a merchant and an account holder. The method also includes sending a response to the account holder device including resolution details. The resolution details include an action taken by the merchant in connection with the transaction. The merchant computer starts a communication session on a dispute resolution platform via a secure communication channel. The method further includes sending the resolution details and the plurality of transaction information to the dispute resolution platform as part of the communication session. The dispute resolution platform stores the plurality of transaction information and the resolution details and is configured to send the resolution details to an issuer computer as part of the communication session and in response to a corresponding transaction inquiry message from the issuer computer. In some embodiments, the action taken by the merchant in connection with the transaction includes refunding funds back to the account holder. The action taken by the merchant in connection with the transaction may include notification of shipment of items purchased by the transaction.

Another embodiment is directed to apparatuses, systems, and computer-readable media configured to perform the methods described above.

These and other embodiments are described in further detail below.

DETAILED DESCRIPTION OF THE INVENTION

Figure 1:
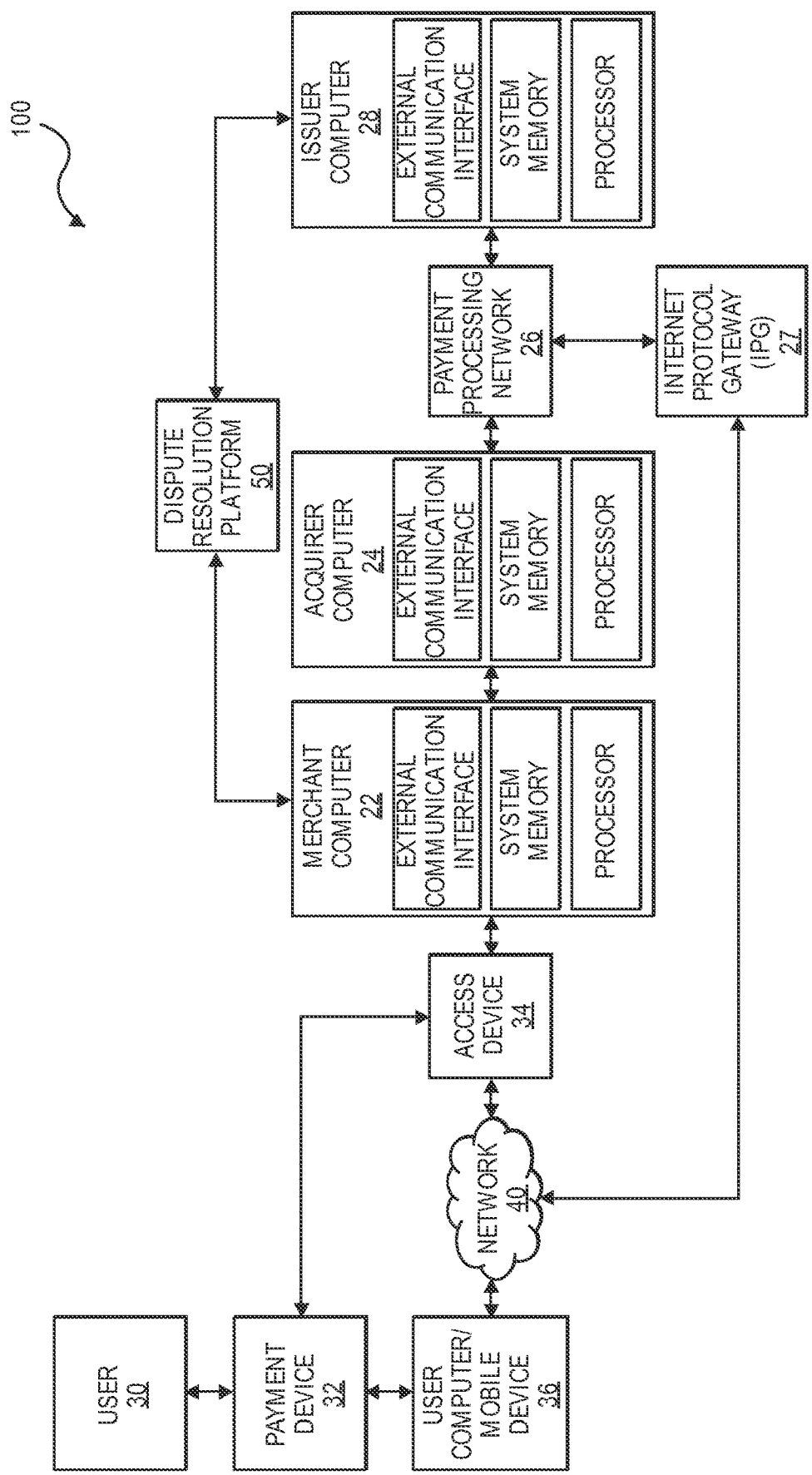
FIG. 1 illustrates an exemplary financial transaction system.

The following disclosure may provide exemplary systems, apparatuses, and methods for conducting a financial transaction and related activities. Although reference may be made to such financial transactions in the examples provided below, embodiments are not so limited. That is, the systems, apparatuses, and methods described herein may be utilized for any suitable purpose.

According to some embodiments of the invention, when an account holder contacts the issuer of the account to dispute a transaction conducted with a merchant using the account, the issuer may receive additional transaction details, such as purchased item level details, from the merchant in response to a real-time purchase inquiry sent to the merchant (or merchant's nominated payment service provider, processor or aggregator) by a merchant integrated dispute resolution platform. The real-time purchase inquiry may request purchase information or transaction information (e.g. purchased item details, order information, order history, shipping and delivery information, etc.) and merchant instructions associated with the transaction. The merchant may send a real-time response to the merchant integrated dispute resolution platform. The merchant integrated dispute resolution platform may send all or a portion of the received information to the issuer and/or the account holder in real-time. The entire communication between the issuer, the merchant integrated dispute resolution platform and the merchant may be a sessionless (or stateless) communication, i.e. all communication among the parties may occur in a single session which may last 10 seconds or less.

Based on the transaction information and the merchant instructions, the formal dispute resolution process can be avoided. For example, if the account holder, who conducted the transaction, claims to have not received a package associated with the transaction, the merchant integrated dispute resolution platform can present evidence of delivery obtained from the merchant in real-time. Similarly, if a high value customer is disputing a small value transaction, the merchant instructions may provide the customer with a voucher/store credit in real-time. This is particularly useful in online purchases, such as music or movie purchases, where the amount in dispute is typically very small. Alternatively, in light of the transaction information received from the merchant, the issuer may identify fraudulent activity and notify the merchant of such activity. Similarly, in light of the transaction information received from the merchant, the issuer may send a dispute intent notification to the merchant informing the merchant of account holder's intent to start formal dispute resolution process. In some embodiments, in light of the transaction information received from the merchant, the issuer may send notifications such as stop recurring payment notification, exception file notification, or information such as new account details, replacing out of date account details previously affected by fraud, to the merchant.

Before discussing specific embodiments and examples, some descriptions of terms used herein are provided below.

As used herein, a "merchant integrated dispute resolution platform" may refer to any suitable platform that facilitates communications between a merchant and an issuer. The communications between the parties may be mainly related to a transaction questioned by an account holder. Merchants may register with the merchant integrated dispute resolution platform to be able to communicate with the issuer in case of disputed transactions. The merchant integrated dispute resolution platform may provide an API to the registered merchants to facilitate communication between the platform and each merchant. The merchant integrated dispute resolution platform may format a communication received from one party before sending the communication to the next party. All communication between the merchant integrated dispute resolution platform and other parties may be use a sessionless (or stateless) protocol.

As used herein, a "communication session" may refer to any communication exchange between two or more communicating devices that is set up or established at a certain point in time, and then torn down at a later point. Multiple messages may be exchanged in a communication session.

As used herein, a "sessionless communication" or a "sessionless protocol" may refer to any communication between two parties that occurs in a single session. The sessionless communication may also be referred as "stateless communication" where each request is treated as an independent communication that is unrelated to any previous request so that the entire communication consists of independent pairs of request and response. A stateless protocol does not require the server to retain session information or status about each communications partner for the duration of multiple requests.

As used herein, an "exception file listing" may refer to a list of account numbers that may have been compromised. For example, a payment device associated with the payment account may have been lost, stolen or otherwise compromised. The exception file listing may be provided by an issuer of accounts in an exception file notification.

As used herein, a "communications channel" may refer to any suitable path for communication between two or more entities. Suitable communications channels may be present directly between two entities such as a dispute resolution platform and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of an Secure Sockets Layer (SSL) session. However, any method of creating a secure channel may be used. By establishing a secure channel, sensitive information related to a payment device (such as account number, CVV (card verification value), expiration dates, etc.) may be securely transmitted between the two entities to facilitate a transaction.

As used herein, "identification information" may include any suitable information associated with an account (e.g. a payment account and/or payment device associated with the account). Such information may be directly related to the account or may be derived from information related to the account. Examples of account information may include a primary account number (PAN) or "account number", user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

As used herein, an "online purchase" can be the purchase of a digital or physical item or service via a network, such as the Internet.

As used herein, a "payment account" (which may be associated with one or more payment devices) may refer to any suitable payment account including a credit card account, a checking account, or a prepaid account.

As used herein, "transaction data/information/details" may refer to any information corresponding to or describing purchases, orders, invoices, payments involving goods, items, services, and/or the like, and may include, but is not limited to, a transaction amount, a merchant identifier for a merchant associated with the transaction, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, the merchant location, confirmation numbers, order numbers, cancellation numbers, shipment status updates (e.g., order being processed, shipped, delivered, on back order, etc.), delivery tracking numbers, cancellation notices, updates, and/or the like.

As used herein, a "merchant identifier" may refer to any suitable indicator including information that may be used to identify a merchant. For example, the merchant identifier may include a corporate tax ID, merchant banking account number, name, address, commercial permit registration number, etc.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. An example of a server computer is described with reference to FIG. 10.

Financial Transaction System

FIG. 1 illustrates an exemplary financial transaction system 100.

As used herein, an "issuer" may typically refer to a business entity (e.g., a bank or other financial institution) that maintains financial accounts for the user 30 (i.e. an account holder) and often issues a payment device 32 such as a credit or debit card to the user 30. As used herein, a "merchant" may typically refer to an entity that engages in transactions and can sell goods or services to the user 30. As used herein, an "acquirer" may typically refer to a business entity (e.g., a commercial bank or financial institution) that has a business relationship with a particular merchant or similar entity. Some entities can perform both issuer and acquirer functions.

The system 100 may include one or more merchants, one or more access devices 34, one or more payment devices 32, one or more acquirers, and one or more issuers. For example, the system 100 may include a merchant having a merchant computer 22 that comprises an external communication interface (e.g. for communicating with an access device 34 and an acquirer computer 24), system memory comprising one or modules to generate and utilize electronic messages, and a data processor (for facilitating a financial transaction and the exchange of electronic messages). The system may also include an acquirer having an acquirer computer 24 that comprises an external communication interface (e.g. for communicating with a merchant computer 22 and a payment processing network 26), system memory comprising one or modules to generate and utilize electronic messages, and a data processor (for facilitating a financial transaction and the exchange of electronic messages). The system may also include an issuer having an issuer computer 28 that comprises an external communication interface (e.g. for communicating with a payment processing network 26), system memory comprising one or modules to generate and utilize electronic messages, and a data processor (for facilitating a financial transaction and the exchange of electronic messages). The external communication interface of the merchant computer 22 may be coupled to an access device 34 (such that information may be received by the access device 34 and communicated to the merchant computer 22) or, in some embodiments, the access device 34 may comprise a component of the merchant computer 22.

As used in this context, an "external communication interface" may refer to any hardware and/or software that enables data to be transferred between two or components of system 100 (e.g., between devices residing at locations such as an issuer, acquirer, merchant, payment processing network 26, etc). Some examples of external communication interfaces may include a modem, a network interface (such as an Ethernet card), a communications port, a Personal Computer Memory Card International Association (PCM-CIA) slot and card, or the like. Data transferred via external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a wide area network (WAN) or a local area network (LAN), the Internet, or any other suitable method.

As would be understood by one of ordinary skill in the art, any suitable communications protocol for storing, representing, and transmitting data between components in the system 100 may be used. Some examples of such methods may include utilizing predefined and static fields (such as in core TCP/IP protocols); "Field: Value" pairs (e.g. HTTP, FTP, SMTP, POP3, and SIP); an XML based format; and/or Tag-Length-Value format.

As shown in the exemplary system 100 in FIG. 1, information from the payment device 32 may be provided to access device 34 either directly (e.g. through a contact or contactless interface) or indirectly thorough a user computer or mobile device 36 (e.g. in an e-commerce environment or other indirect transaction) via network 40 (such as the Internet). In some embodiments, the user computer or mobile device 36 may interact with the payment processing network 26 (or other entity in the system 20) via the network 40 to form a first communications channel, such as through an Internet Protocol Gateway (IPG) 27. The IPG 27 may be in operative communication with the payment processing network 26. Although the IPG 27 is shown as being a separate entity in FIG. 1, the IPG 27 could be incorporated into the payment processing network 26, or could be omitted from the system 20. In the latter situation, the first communications channel could directly connect the payment processing network 26 and the user computer or mobile device 36. In general, providing communication from the user 30 to the payment processing network or other entity may enable a variety of increased functionalities to the user 30, such as advanced authentication and verification methods (particularly in e-commerce and similar transactions). However, embodiments are not so limited.

The payment processing network 26 may be disposed between the acquirer computer 24 and the issuer computer 28 in the system 20. A dispute resolution platform 50 may be in communication with the merchant computer 22 and the issuer computer 28. In some embodiments, the dispute resolution platform 50 may be in communication with the acquirer computer 24 instead of, or in addition to, the merchant computer 22. Furthermore, the merchant computer 22, the acquirer computer 24, the payment processing network 26, the issuer computer 28 and the dispute resolution platform 50 may all be in operative communication with each other (i.e. although not depicted in FIG. 1, one or more communication channels may exist between each of the entities, whether or not these channels are used in conducting a financial transaction).

A typical credit card transaction flow using a payment device 32 at an access device 34 (e.g. point-of-sale (POS) location) can be described as follows. (Note that embodiments of the invention are not limited to credit card transactions, but may also include other types of payment transactions including prepaid, debit, mobile device transactions). A user 30 presents his or her payment device 32 to an access device 34 to pay for an item or service. The payment device 32 and the access device 34 interact such that information from the payment device 32 (e.g. PAN, verification value(s), expiration date, etc.) is received by the access device 34 (e.g. via contact or contactless interface). The merchant computer 22 may then receive this information from the access device 34 via the external communication interface. The merchant computer 22 may generate an authorization request message that includes the information received from the access device 34 (i.e. information corresponding to the payment device 32) along with additional transaction information (e.g. a transaction amount, merchant specific information, etc.) and electronically transmit this information to an acquirer computer 24. The acquirer typically represents, and vouches for, the merchant in financial transactions (e.g. credit card transactions). The acquirer computer 24 may then receive (via its external communication interface), process, and forward the authorization request message to a payment processing network 26 for authorization.

An exemplary payment transaction is discussed next. In general, prior to the occurrence of a payment transaction, the payment processing network 26 has an established protocol with each issuer on how the issuer's transactions are to be authorized. In some cases, such as when the transaction amount is below a threshold value, an authorization module of the payment processing network 26 may be configured to authorize the transaction based on information that it has about the user's account without generating and transmitting an authorization request message to the issuer computer 28. In other cases, such as when the transaction amount is above a threshold value, the payment processing network 26 may receive the authorization request message from the merchant computer 22 or the acquirer computer 24, determine the issuer associated with the payment device 32. The payment processing network 26 may then forward the authorization request message for the transaction to the issuer computer 28 for verification and authorization. As part of the authorization process, the payment processing network 26 or the issuer computer 28 may analyze a verification value or other datum provided by the payment device 32. The verification value may be stored at the issuer or the payment processing network 26. Once the transaction is authorized, the issuer computer 28 may generate an authorization response message (that may include an authorization code indicating the transaction is approved or declined) and transmit this electronic message to the payment processing network 26. The payment processing network 26 may then forward the authorization response message via a communication channel to the acquirer computer 24, which may transmit the electronic message comprising the authorization indication to the merchant computer 22.

In the payment transaction industry, the authorization indication typically takes the form of an authorization code, which is five or six alphanumeric characters, by convention. It serves as proof to the merchant and the user that the issuing bank or payment processing network has authorized the transaction, and may be used by the merchant or the card holder as proof of authorization if the issuing bank later disputes the transaction, such as during settlement.

When a user 30 wishes to make an online purchase with a merchant over the Internet (i.e. e-commerce), a similar method as described above may be performed except that the user 30 may use his computer apparatus or mobile device 36 to provide information associated with a payment device 32 (e.g. account number, user's name, expiration date, verification value, etc.) into respective fields on the merchant's checkout page (e.g. functioning as an access device 34). The access device 34 may then provide this information to the merchant computer 22, and the remaining steps described above may be performed.

Conventional Dispute Resolution System

Figure 2:
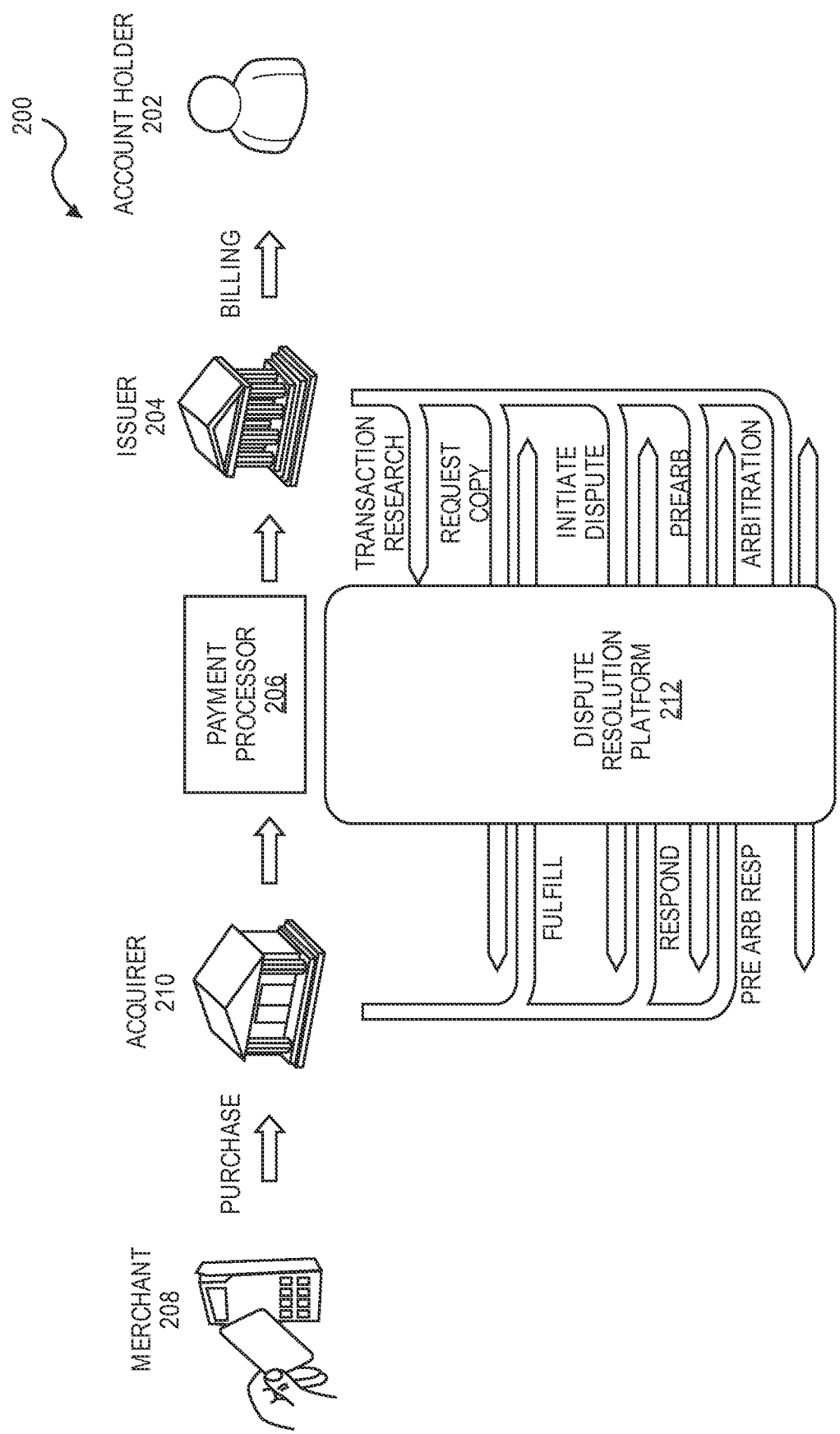
FIG. 2 illustrates a conventional dispute resolution system.

FIG. 2 depicts a conventional dispute resolution system 200. Conventional dispute resolution systems force the acquirers and the merchants to prove that the disputed charge is valid. This is a time consuming and costly process that generally provides a poor experience for all involved. The dispute process can be initiated by the account holder 202 when they contact their issuer 204 (e.g., through a web interface, by phone through a call center, etc.). In conventional dispute resolution systems, the issuer 204, the payment processor 206, and the merchant 208/acquirer 210 are not aware of any steps taken by other parties to address the disputed transactions. This can lead to unjust enrichment of consumers who request refunds or credits from multiple entities. For example, the account holder 202 may dispute the charge directly with the merchant 208 and get a refund or credit from the merchant 208. Subsequently, the account holder 202 may dispute the charge with the issuer 204 and get a refund from the issuer 204 for the same transaction. It is also a costly and time consuming process, particularly for small value transactions (e.g., transactions for digital goods, in-app purchases, etc.). Typically, a dispute resolution using conventional dispute resolution systems may take up to 90 days. Additionally, the chargebacks typically are classified as fraud, resulting in the customer being issued a new account and new payment device, incurring additional costs to the issuer.

As illustrated in FIG. 2, the account holder 202 may start the dispute by contacting the issuer 204 with transaction questions. For example, the account holder 202 may check their billing statement and realize a transaction that was not initiated by the account holder 202. Alternatively, the account holder 202 may contact the issuer 204 about a transaction where the payment has been authorized by the account holder 202 but the account holder 202 either did not receive the items purchased or received damaged/defective items. The issuer 204 may then interact with a dispute resolution platform 212 and request research regarding the transaction identified by the account holder 202. For example, the issuer 204 may request a copy of the transaction documents, such as the receipt and, if the payment was made using a payment card, the payment slip. The dispute resolution platform 212 may forward the issuer's request to the acquirer 210. Upon receipt of the document request, the acquirer 210 (or the merchant 208) may have a predetermined amount of time, such as 30 days, to provide a reply to prevent an automatic chargeback. Upon receiving the transaction documents, the issuer 204 may analyze the documents and start a dispute with the acquirer 210. Additional time may pass between the issuer 204 receiving the transaction documents and initiating the dispute. Upon receiving the dispute notification from the issuer 204, the acquirer 210 may provide a response within a predetermined amount of time, e.g. 30 days to 60 days. Based on the acquirer's response, the issuer 204 may choose to use arbitration to resolve the issue. Prior to starting the arbitration, a pre-arbitration process may require the acquirer 210 to provide additional information in a response. Upon receiving the acquirer's response, the issuer 204 may start the arbitration and resolve the dispute.

Accordingly, conventional dispute resolution takes about 90 days to complete from initiation. Moreover, the account holder may directly contact the merchant to request a refund or a credit after the account holder initiated the dispute resolution with the issuer. As such, the account holder may get refunded twice, once by the merchant and once by the issuer. In addition, dispute resolution process may result in categorizing the payment device (e.g. the payment card) as compromised and require new payment device to be issued to the account holder. This is an added burden and cost to the issuer.

Merchant Integrated Dispute Resolution System

Embodiments provide a merchant integrated dispute resolution platform that is in communication with the issuer and the merchant. The merchant integrated dispute resolution platform processes a dispute resolution request in a sessionless communication (i.e. in a single communication session) that lasts up to about 10 seconds. All communications between the issuer/merchant and the merchant integrated dispute resolution platform occur in real-time. That is, the communications are forwarded to the intended party as they are generated by the sending party. Accordingly, the entire chain of communications between the issuer and the merchant may be handled by the merchant integrated dispute resolution platform in about 10 seconds.

Figure 3A:
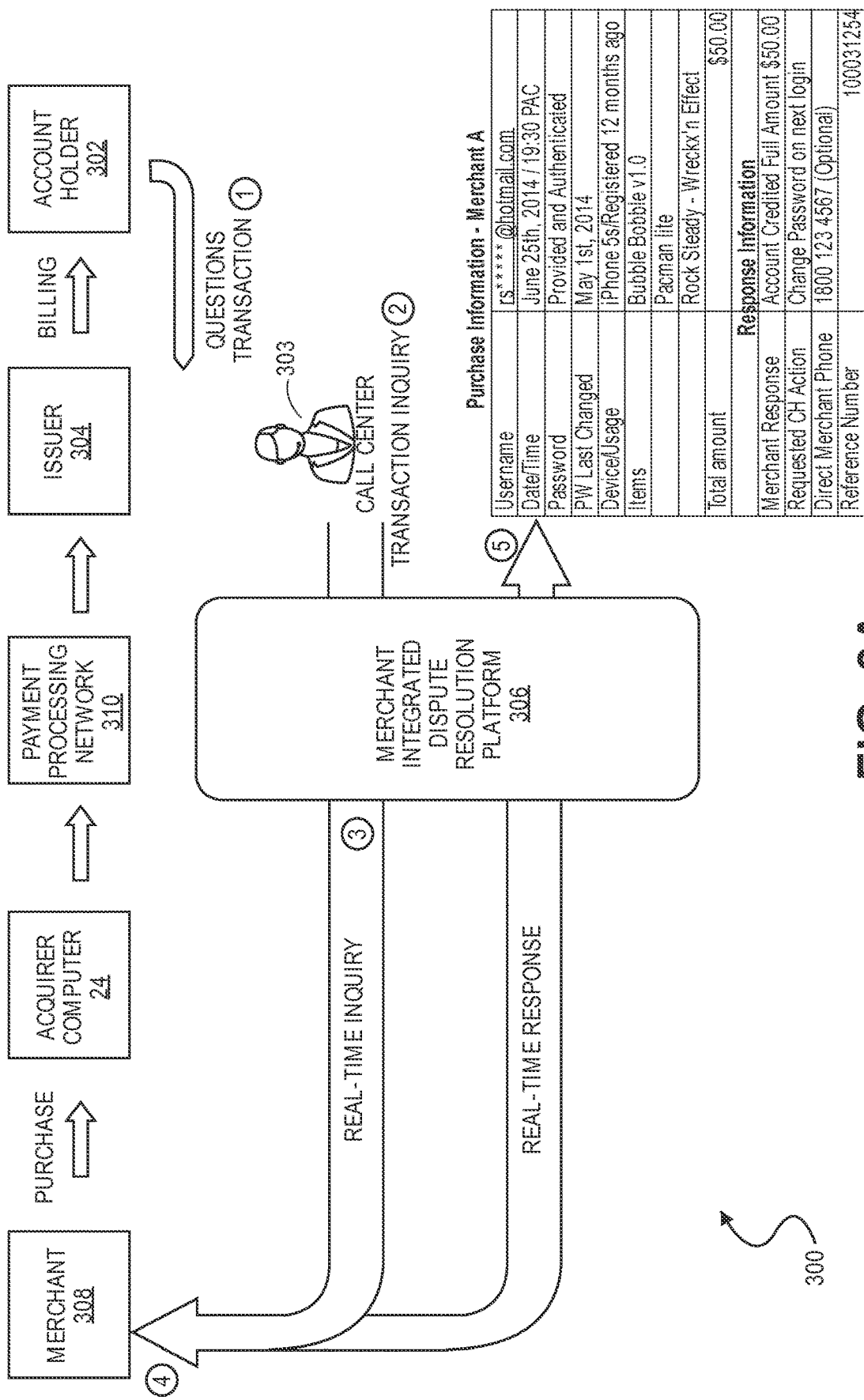
FIG. 3A illustrates a merchant integrated dispute resolution system including a dispute resolution platform accessed by a call center, in accordance with an embodiment of the present invention.

FIG. 3A depicts an exemplary merchant integrated dispute resolution system 300, in accordance with an embodiment of the present invention. The merchant integrated dispute resolution system 300 includes a merchant integrated dispute resolution platform 306 in communication with an issuer 304 (e.g. issuer computer 28) and a merchant 308 (e.g. merchant computer 22). Embodiments of the present invention allow merchants and issuers to integrate directly with the merchant integrated dispute resolution platform 306, allowing for real-time transaction information to be retrieved from the merchant 308 (e.g. merchant computer 22) by the issuer 304 (e.g. issuer computer 28), making it easier to avoid the dispute resolution process completely. According to various embodiments, the merchant integrated dispute resolution platform 306 may be integrated with or managed by the payment processing network 310.

According to various embodiments, account holder 302 can contact their issuer 304 to question a transaction. For example, the account holder 302 can call a call center 303 associated with the issuer 304 (step 1). In some embodiments, the call center 303 can be associated with the merchant integrated dispute resolution platform 306. Upon receiving the transaction inquiry from the account holder 302, a call center representative can send a transaction inquiry message to the merchant integrated dispute resolution platform 306 and request transaction information to be provided to the issuer 304 or the account holder 302 (step 2). The transaction inquiry message can include certain details about the transaction in question, such as a merchant name, merchant identifier, transaction number, or other details.

According to various embodiments, merchants may register with the merchant integrated dispute resolution platform 306 to be able to participate in the merchant integrated dispute resolution system 300. The merchant registration process is discussed below in connection with FIG. 4.

Upon receiving the transaction inquiry message, the merchant integrated dispute resolution platform 306 may analyze the message to determine a merchant identifier included in the message. Upon identifying the merchant, the merchant integrated dispute resolution platform 306 may generate a purchase inquiry message for the identified merchant. The merchant integrated dispute resolution platform 306 may send the purchase inquiry message to the merchant 308 in real-time using an application programming interface (API) (e.g. an Extensible Markup Language (XML) request, an XMLHttpRequest, etc.) for that merchant (step 3). According to various embodiments, the merchant 308 may specify an address (e.g. a Uniform Resource Locator (URL), an Internet Protocol (IP) address) to call when registering with the merchant integrated dispute resolution platform 306. In some embodiments, the merchant may be assigned an address (e.g. a URL) by the merchant integrated dispute resolution platform 306 upon registration. The merchant integrated dispute resolution platform 306 may then place an API call to merchant's URL to send the real-time purchase inquiry message.

In some embodiments, the merchant may nominate another party to interact with the merchant integrated dispute resolution platform 306. For example, the merchant may nominate the payment service provider, processor or aggregator to handle the requests or inquiries from the merchant integrated dispute resolution platform 306. Accordingly, the merchant integrated dispute resolution platform 306 may send the purchase inquiry message to the payment service provider, processor or aggregator nominated by the merchant.

In some embodiments, during registration, the merchant may provide the merchant integrated dispute resolution platform 306 with credentials (e.g. username, password and security certificates) for accessing the URL. The dispute resolution platform 306 may store the credentials at a storage or database. The merchant integrated dispute resolution platform 306 may retrieve the credentials from the storage and provide the credentials to the merchant when placing the API call to the merchant's URL.

In some embodiments, the merchant integrated dispute resolution platform 306 may format the purchase inquiry message according to a schema. In some embodiments, a merchant can specify a schema to be used when communicating with that merchant. In other embodiments, a common schema can be specified by the merchant integrated dispute resolution platform 306 and used to communicate with all registered merchants. The merchants may be notified of the schema upon registration.

The merchant 308 may be continuously listening to requests or messages from the merchant integrated dispute resolution platform 306. Upon receipt of the purchase inquiry message formatted using the schema, the merchant 308 may recognize the transaction data in pre-determined fields, such as the purchase information including an account holder name, date and time of the transaction, password (where applicable), billing address, shipping address, items purchased, etc. The merchant 308 may identify, in real-time, the specific transaction using the purchase information provided in the purchase inquiry message. The merchant 308 may provide, to the merchant integrated dispute resolution platform 306, additional details associated with the identified transaction in a real-time response (step 4). The merchant 308 may format the real-time response using the schema specified by, or assigned to, the merchant 308. The merchant integrated dispute resolution platform 306 may provide the additional details associated with the transaction to the issuer 304 and/or the account holder 302 via the call center 303 (step 5).

All the communications between the account holder, issuer, merchant integrated dispute resolution platform and the merchant may occur in a single communication session. Specifically, the communications may be stateless. According to some embodiments, the account holder 302 may receive a response (including transaction details provided by the merchant) to his/her transaction inquiry in about 10 seconds.

In some embodiments, the response can include detailed purchase details associated with the item purchased, which may remind the account holder of what the purchase was, avoiding a dispute. In some embodiments, the merchant may provide resolution instructions. For example, the account holder may be a high value customer and the merchant may automatically issue a credit to the account holder.

Figure 3B:
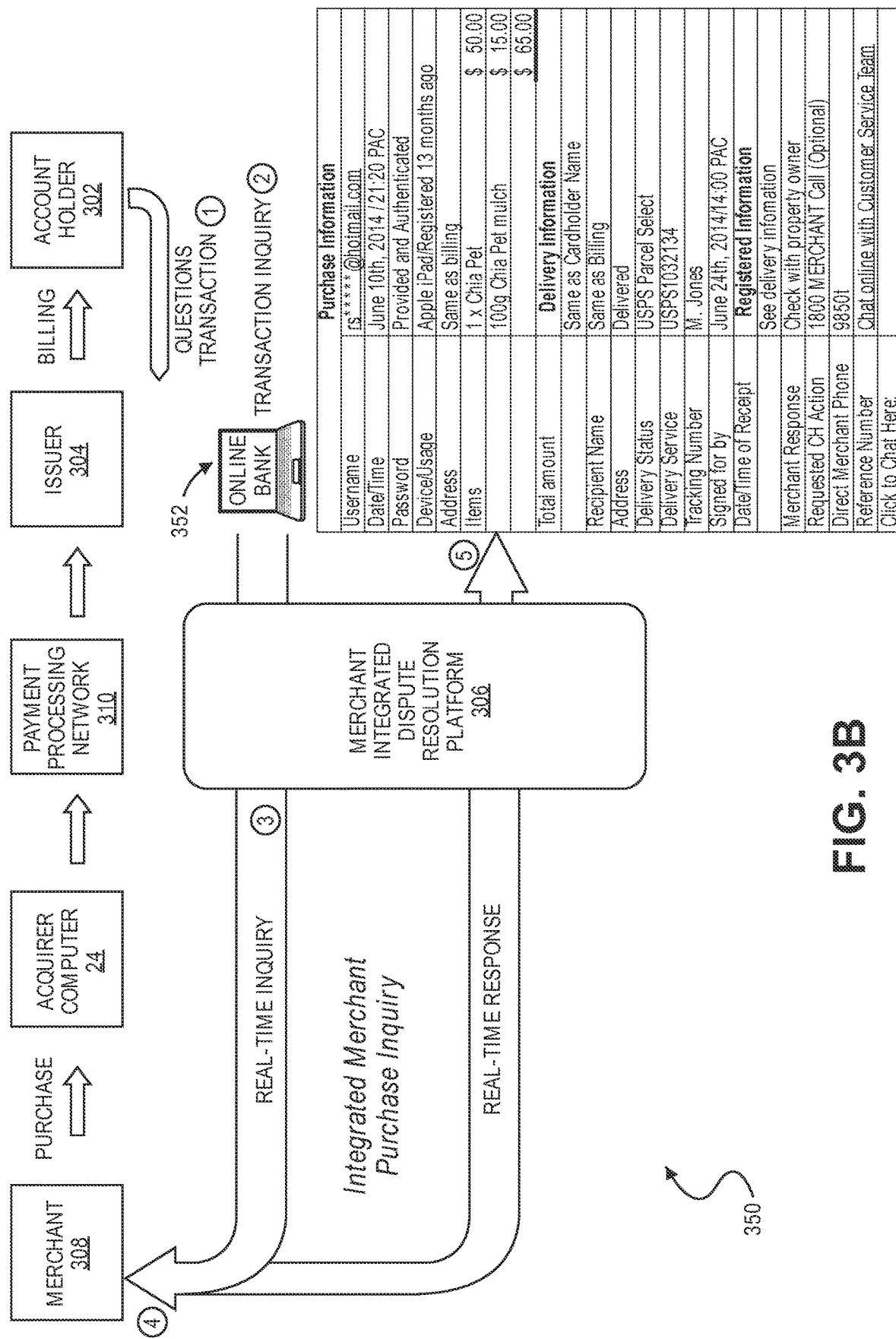
FIG. 3B illustrates a merchant integrated dispute resolution system including a dispute resolution platform accessed by online banking portal, in accordance with an embodiment of the present invention.

FIG. 3B depicts a merchant integrated dispute resolution system 350, in accordance with another embodiment of the present invention. FIG. 3B illustrates a similar dispute resolution process to that illustrated in FIG. 3A. In the merchant integrated dispute resolution system 350 an online banking service 352 is provided instead of (or in addition to)

the call center 303 illustrated in FIG. 3A. In the merchant integrated dispute resolution system 350, the account holder 302 may contact their issuer 304 through the online banking service (e.g., web interface) 352 to inquire about a transaction (step 1). In some embodiments, the online banking service 352 may allow the account holder 302 to directly contact the merchant integrated dispute resolution platform 306. The account holder 302 may inquire about a transaction using the online banking service 352. The online banking service 352 may generate and send a transaction inquiry message to the merchant integrated dispute resolution platform 306 to request transaction information to be provided to the issuer 304 or the account holder 302 (step 2). The remaining exchange of messages between the issuer 304, merchant integrated dispute resolution platform 306 and the merchant 308 may be similar to that illustrated in FIG. 3A. Specifically, upon identifying the merchant, the merchant integrated dispute resolution platform 306 may generate a purchase inquiry message for the identified merchant. The merchant integrated dispute resolution platform 306 may send the purchase inquiry message to the merchant 308 in real-time using an API for that merchant (step 3). The merchant 308 may provide, to the merchant integrated dispute resolution platform 306, additional details associated with the identified transaction in a real-time response (step 4). The transaction details provided by the merchant 308 may be forwarded to the issuer 304 and/or the account holder 302 by the merchant integrated dispute resolution platform 306 using the online banking service 352 (step 5). For example, the transaction information provided by the merchant may be rendered within the online banking service 352 and presented to the account holder 302 (e.g. the account holder). The transaction information may include delivery information and suggested actions, such as to check with a property owner or neighbor who may have signed for the goods. The transaction information may also provide contact information to escalate the dispute with the merchant.

Similarly, all communications between the account holder, issuer, merchant integrated dispute resolution platform and the merchant may occur in a single communication session. According to some embodiments, the account holder 302 may receive a response (including transaction details provided by the merchant) to his/her transaction inquiry in about 10 seconds.

Examples of data elements that may be exposed through a merchant integrated dispute resolution system may vary depending on transaction type. For example, for digital goods (digital media, apps, in-app purchases, etc.) the data elements may include e-mail address/account holder account ID, itemized receipt of purchase, authentication information, device purchase history, application/game which generated the purchase, etc. For goods that are delivered, the data elements may include delivery address, tracking details and postage provider, proof of delivery and receipt, and other evidence. In some embodiments, the merchant response may include credit information, voucher information and redemption instructions, contact us information (or put account holder through to 1800 . . . ), and web-service to 'Problem with Purchase?', and similar information. In some embodiments, other data elements may include device IP address, device name and ID, geographic location, prior purchase history, images or documentation, special instructions, page link to item sold, prior communications, packing slip (contents), condition of goods, version of item, and return policy.

Figure 4:
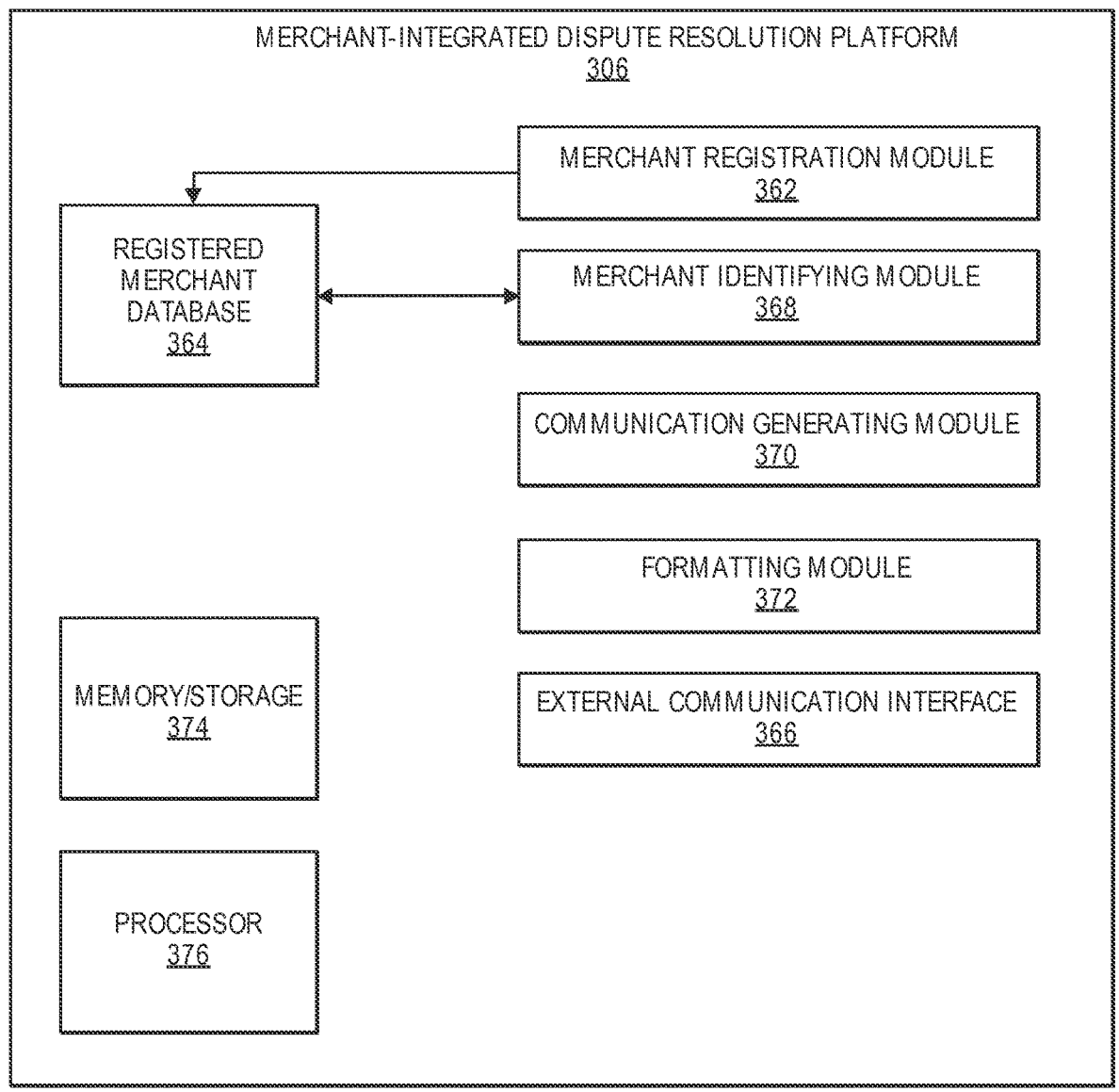
FIG. 4 illustrates an exemplary dispute resolution platform, in accordance with an embodiment of the present invention.

FIG. 4 illustrates an exemplary dispute resolution platform, in accordance with an embodiment of the present invention. The merchant integrated dispute resolution platform 306 may include a merchant registration module 362, a registered merchant database 364, an external communication interface 366, a merchant identifying module 368, a communication generating module 370, a formatting module 372, a system memory 374 comprising one or modules to generate and utilize electronic messages, and a data processor 376 (for facilitating the generation and exchange of electronic messages).

The merchant registration module 362 registers merchants with the merchant integrated dispute resolution platform 306. The registered merchant database 364 stores the registered merchant information such as a merchant identifier, merchant name, address, merchant type, etc. associated with each registered merchant. As provided above, the merchant may provide an address (e.g. a URL) to the merchant integrated dispute resolution platform 306 upon registration. Alternatively, the merchant integrated dispute resolution platform 306 may assign an URL to the merchant upon registration. The merchant integrated dispute resolution platform 306 may store the URL along with other merchant data in the registered merchant database 364.

The external communication interface 366 facilitates the merchant integrated dispute resolution platform 306 to interact with external parties, such as the issuer, the merchant, the account holder or the call center. For example, the merchant integrated dispute resolution platform 306 may receive the transaction inquiry message from the call center via the external communication interface 366. The external communication interface 366 may establish two different communication channels: a first communication channel for communicating with issuers, and a second communication channel for communicating with the merchants. In some embodiments, a third communication channel may be established to communicate with certain issuers (e.g. issuers that may have a VIP status with the payment processing network or the merchant integrated dispute resolution platform).

The merchant identifying module 368 of the merchant integrated dispute resolution platform 306 may identify the merchant associated with the transaction using the merchant identifier provided in the transaction inquiry message received from the issuer. Specifically, the merchant identifying module 368 may search the registered merchant database 364 for a match with the received merchant identifier. Once the merchant is identified, the communication generating module 370 for generating the purchase inquiry message for the identified merchant.

Prior sending the purchase inquiry message to the identified merchant, the merchant integrated dispute resolution platform 306 may format the purchase inquiry message using the formatting module 372. In some embodiments, a merchant can specify a schema to be used when communicating with that merchant. The merchant-specified schema may be stored in the registered merchant database 364 with the corresponding merchant. In other embodiments, a common schema can be specified by the merchant integrated dispute resolution platform 306 and used to communicate with all registered merchants. The merchants may be notified of the schema upon registration. The formatting module 372 may also format any other message/notification sent from the issuer to the merchant using the same or a different schema. Similarly, the formatting module 372 may format the responses received from the merchant 308 prior to forwarding the responses to the issuer 304.

Transaction Inquiry and Response Flows

Figure 5:
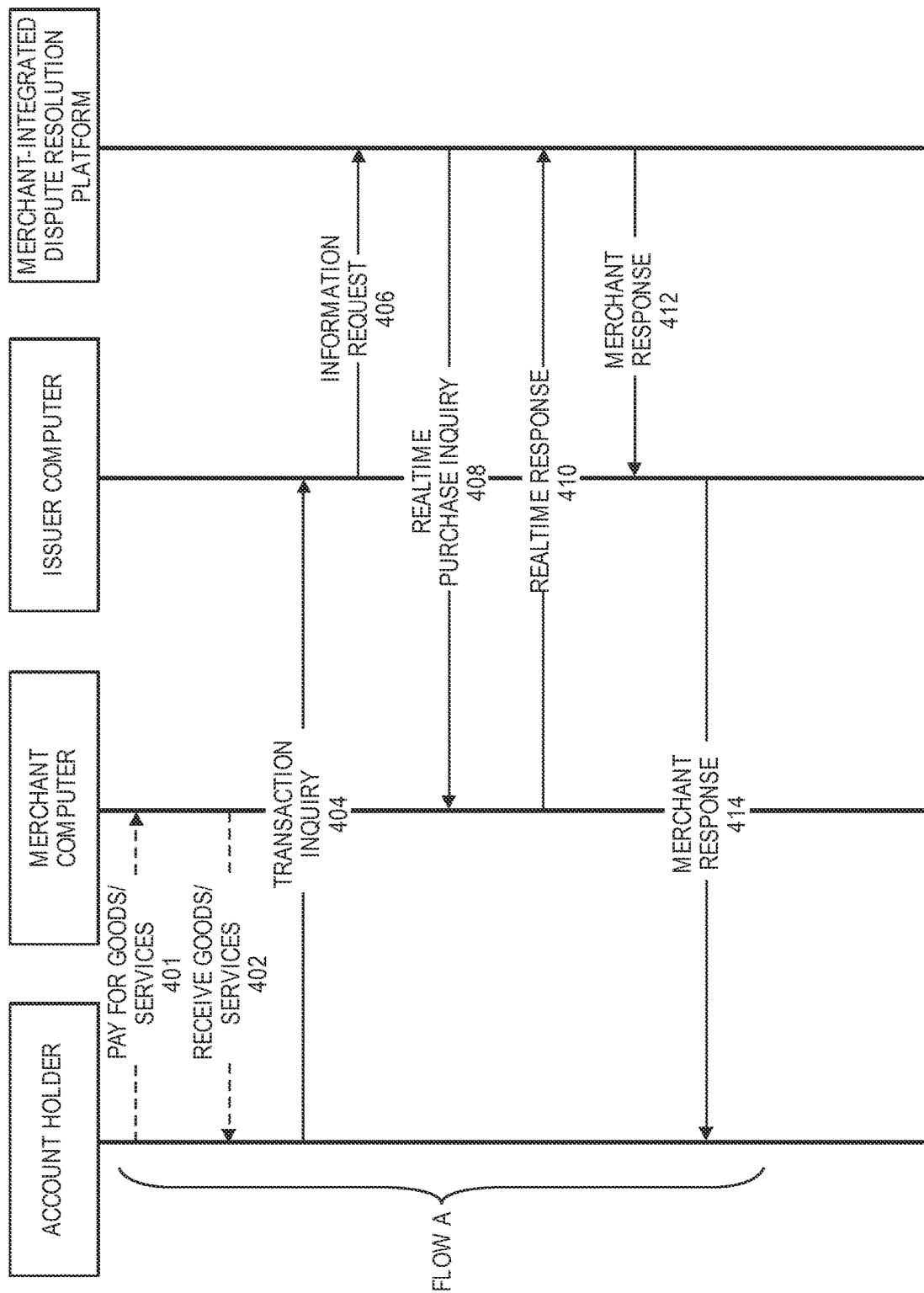
FIG. 5 illustrates a transaction inquiry flow using a merchant integrated dispute resolution system, in accordance with an embodiment of the present invention.

FIG. 5 illustrates a transaction inquiry flow using a merchant integrated dispute resolution system, in accordance with an embodiment of the present invention. At step 401, the account holder can conduct a transaction with a merchant by paying for goods or services sold by the merchant. At step 402, the merchant can provide the account holder with their purchased goods/services. The steps 401 and 402 may be optional because the transaction may in fact be conducted by a fraudster instead of the account holder, or the account holder may never receive the goods or services that were paid for. However, in some embodiments, the transaction may be legitimate but the account holder may not remember the details of the transaction (e.g. account holder may not recognize the name of the merchant on their account statement). In light of any the foregoing scenarios the account holder may wish to receive additional details about that transaction. The account holder can inquire about the transaction with their issuer at step 404. At step 406, the issuer can send a transaction information request message to a merchant integrated dispute resolution platform regarding the transaction. The transaction information request message may include account holder provided information about the transaction. For example, the transaction information request message may include a merchant identifier, a time and place of the transaction, an amount of the transaction, an identifier of the account holder, etc. Using the merchant identifier, the merchant integrated dispute resolution platform may determine that the transaction was conducted at a merchant who is registered with the merchant dispute resolution platform. Accordingly, at step 408, the merchant integrated dispute resolution platform can automatically generate a real-time purchase inquiry. For example, the merchant integrated dispute resolution platform may generate an API call to a merchant specified URL to send the real-time purchase inquiry to the merchant.

According to various embodiments, the communication connection between the merchant integrated dispute resolution platform and the merchant may be a HyperText Transfer Protocol (HTTP) stateless Simple Object Access Protocol (SOAP) or Representational State Transfer (REST) request/response model. The merchant integrated dispute resolution platform may support REST XML or SOAP XML, and the merchant may implement REST XML or SOAP XML. According to various embodiments, the merchant integrated dispute resolution platform may make a SOAP call (i.e. request) to the merchant and the merchant may respond to the SOAP request (i.e. response). All communication between the merchant integrated dispute resolution platform and the merchant may happen on HTTP secure (HTTPS protocol). The parties may use various authentication methods, such as HTTP basic authentication, mutual SSL authentication, WS-I SSL/SOAP security authentication or trusted hosts/XML digital signature.

As used herein, "real-time" may refer to the message being generated immediately upon receipt of the inquiry or request. In some embodiments, a "real-time" response is a response that is received in less than 10 minutes, 5 minutes, 1 minute, 30 seconds, 10 seconds, or 5 seconds. That is, the merchant integrated dispute resolution platform may generate the real-time purchase inquiry immediately upon receiving the transaction information request from the issuer. Similarly, the issuer may also generate the transaction information request in real-time, i.e. upon receipt of the transaction inquiry from the account holder.

Upon receipt of the inquiry, the merchant may query its databases or storage locations to locate the transaction and associated details. At step 410, the merchant integrated dispute resolution platform can receive a real-time purchase response from the merchant. In some embodiments, the response can be formatted according to a schema published by the merchant integrated dispute resolution platform. The merchant integrated dispute resolution platform may reformat the response received from the merchant as needed to be viewed by the issuer. At step 412, the merchant integrated dispute resolution platform may provide the merchant's response to the issuer. The issuer may provide all or a portion of the information received from the merchant integrated dispute resolution platform to the account holder at step 414.

All communications illustrated in FIG. 5 between the account holder, the issuer, the merchant integrated dispute resolution platform and the merchant (starting with the transaction inquiry at step 404 and ending with the merchant response being provided to the account holder at step 414) may occur in a single communication session. This may be referred as a sessionless communication or a sessionless call. According to some embodiments, the account holder may receive a response (including transaction details provided by the merchant) to his/her transaction inquiry in about 10 seconds. Upon receipt of the merchant response, the account holder may be satisfied with the details and end the communication session. Alternatively, the account holder may wish to dispute the transaction. For example, the account holder may realize that the transaction is a fraudulent one or that the response provided by the merchant is not satisfactory.

Figure 6:
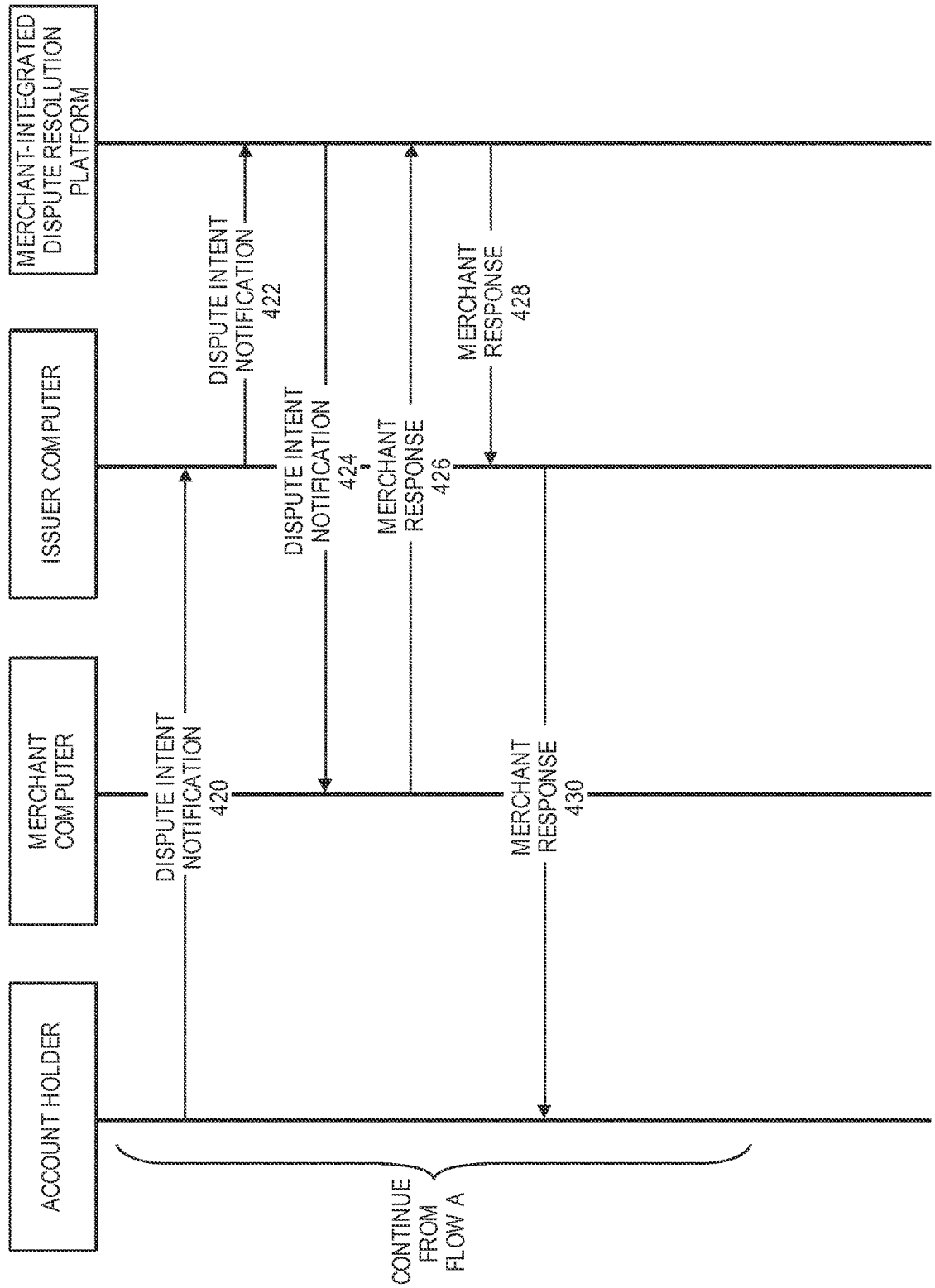
FIG. 6 illustrates a dispute intent notification flow using a merchant integrated dispute resolution system, in accordance with an embodiment of the present invention
Figure 7:
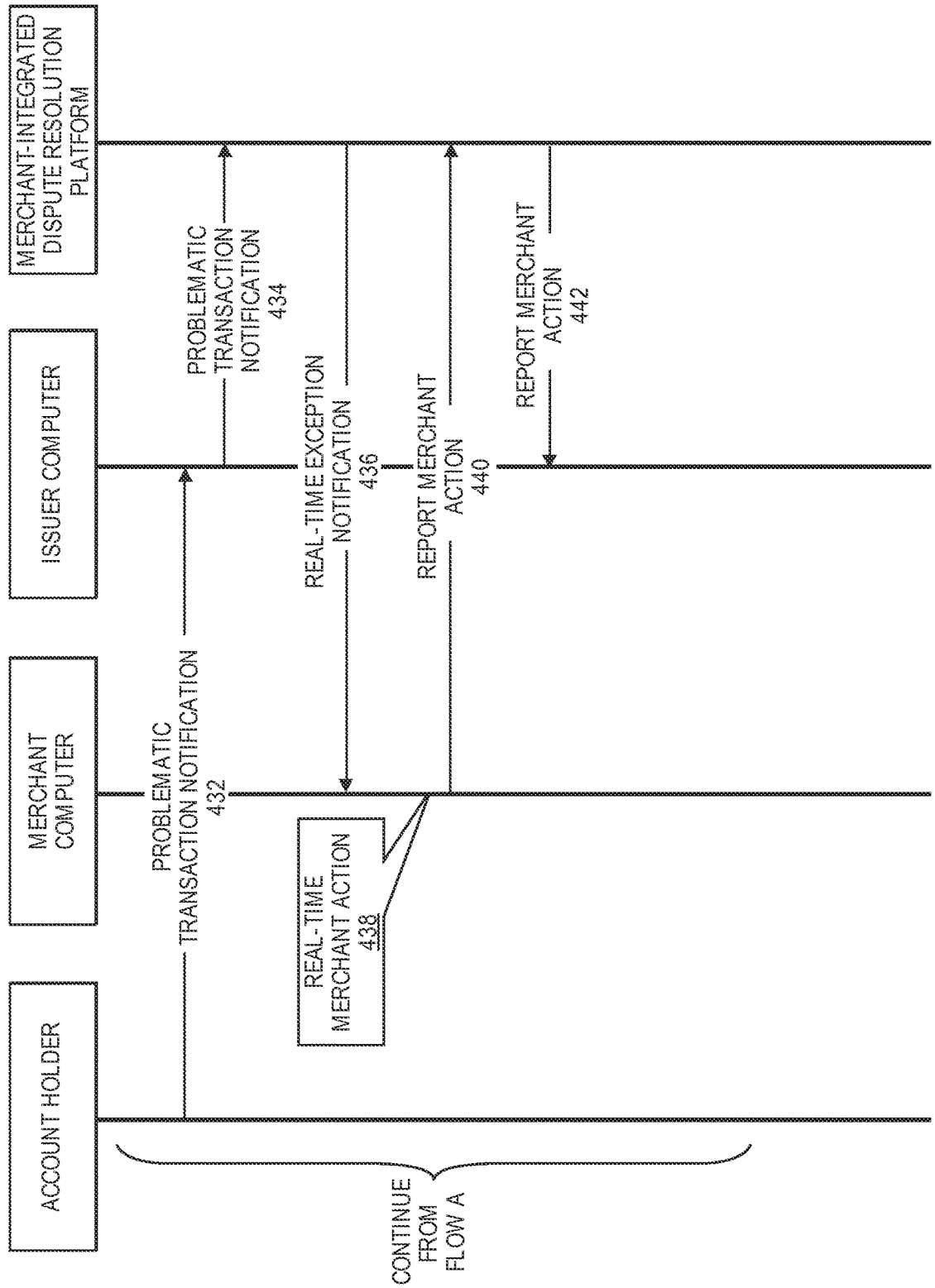
FIG. 7 illustrates an exception notification flow using a merchant integrated dispute resolution system, in accordance with an embodiment of the present invention

FIGS. 6 and 7 illustrate flows where additional interaction occurs between the parties after the merchant response is provided to the issuer and/or account holder via the merchant integrated dispute resolution platform. Accordingly, each of the flows illustrated in FIGS. 6 and 7 is a continuation of the flow illustrated in FIG. 5.

FIG. 6 illustrates a dispute intent notification flow using a merchant integrated dispute resolution system, in accordance with an embodiment of the present invention. As provided above, upon receiving the merchant response at step 414, the account holder may wish to dispute the transaction. For example, the account holder may realize that the transaction is a fraudulent one or that the response provided by the merchant is not satisfactory. At step 420, the account holder may notify the issuer of their intent to dispute the transaction. At step 422, the issuer may forward the dispute intent notification to the merchant integrated dispute resolution platform. The dispute intent notification may detail the nature of the dispute from the account holder in view of the transaction information provided by the merchant. At step 424, the merchant integrated dispute resolution platform may send the dispute intent notification to the merchant. For example, the merchant integrated dispute resolution platform may generate an API call to the merchant-specified URL for sending the dispute intent notification to the merchant. Prior to sending the dispute intent notification to the merchant, the merchant integrated dispute resolution platform may format the notification using the schema associated with the merchant. In some embodiments, the schema used by the merchant integrated dispute resolution platform may be a notification-specific schema. For example, the merchant integrated dispute resolution platform may use a first schema to format the dispute intent notifications and a second schema to format fraud notifications (discussed below in connection with FIGS. 7 and 9). At step 426, the merchant may respond to the dispute intent notification. The merchant response may include a credit, a refund or a voucher. In some embodiments, the merchant response may include a request to proceed to the formal dispute resolution process. At step 428, the merchant integrated dispute resolution platform may send the merchant response to the issuer, who may forward the merchant response to the account holder at step 430.

All communications illustrated in FIGS. 5 and 6 between the account holder, the issuer, the merchant integrated dispute resolution platform and the merchant (starting with the transaction inquiry at step 404 and ending with the merchant response being provided to the account holder at step 430) may occur in a single communication session. This may be referred as a sessionless communication or a sessionless call. According to some embodiments, the account holder may receive a response to his/her transaction inquiry in about 10 seconds after the account holder contacts the issuer to inquire about the transaction at step 404.

FIG. 7 illustrates an exception notification flow using a merchant integrated dispute resolution system, in accordance with an embodiment of the present invention. Upon receiving the merchant response at step 414, the account holder may realize that the transaction has not been authorized by the account holder. For example, the payment account information of the account holder may have been compromised (e.g. payment card lost, account information stolen or otherwise compromised). At step 432, the account holder may notify their issuer that the transaction is problematic and that their account appear to be compromised. The issuer may send a problematic transaction notification to the merchant integrated dispute resolution platform at step 434. At step 436, the merchant integrated dispute resolution platform may generate a real-time exception notification and send the real-time exception notification to the merchant. In some embodiments, the merchant integrated dispute resolution platform may format the real-time exception notification using a schema before sending the notification to the merchant. Upon receipt of the exception notification from the merchant integrated dispute resolution platform, the merchant may take real-time action to mitigate its loss. For example, the merchant may stop shipment or withhold delivery on an item purchased in the transaction. At step 440, the merchant may notify the merchant integrated dispute resolution platform of the steps taken by the merchant in response to the exception notification. At step 442, the merchant integrated dispute resolution platform may report the merchant action to the issuer. Accordingly, parties to the dispute may be better informed of each other's resolution or restitution actions.

All communications illustrated in FIGS. 5 and 7 between the account holder, the issuer, the merchant integrated dispute resolution platform and the merchant (starting with the transaction inquiry at step 404 and ending with the merchant response being provided to the issuer at step 442) may occur in a single communication session. This may be referred as a sessionless communication or a sessionless call. According to some embodiments, the issuer and the merchant may be notified about the problematic transaction reported by the account holder in about 10 seconds after the account holder initially contacts the issuer to inquire about the transaction at step 404.

Figure 8:
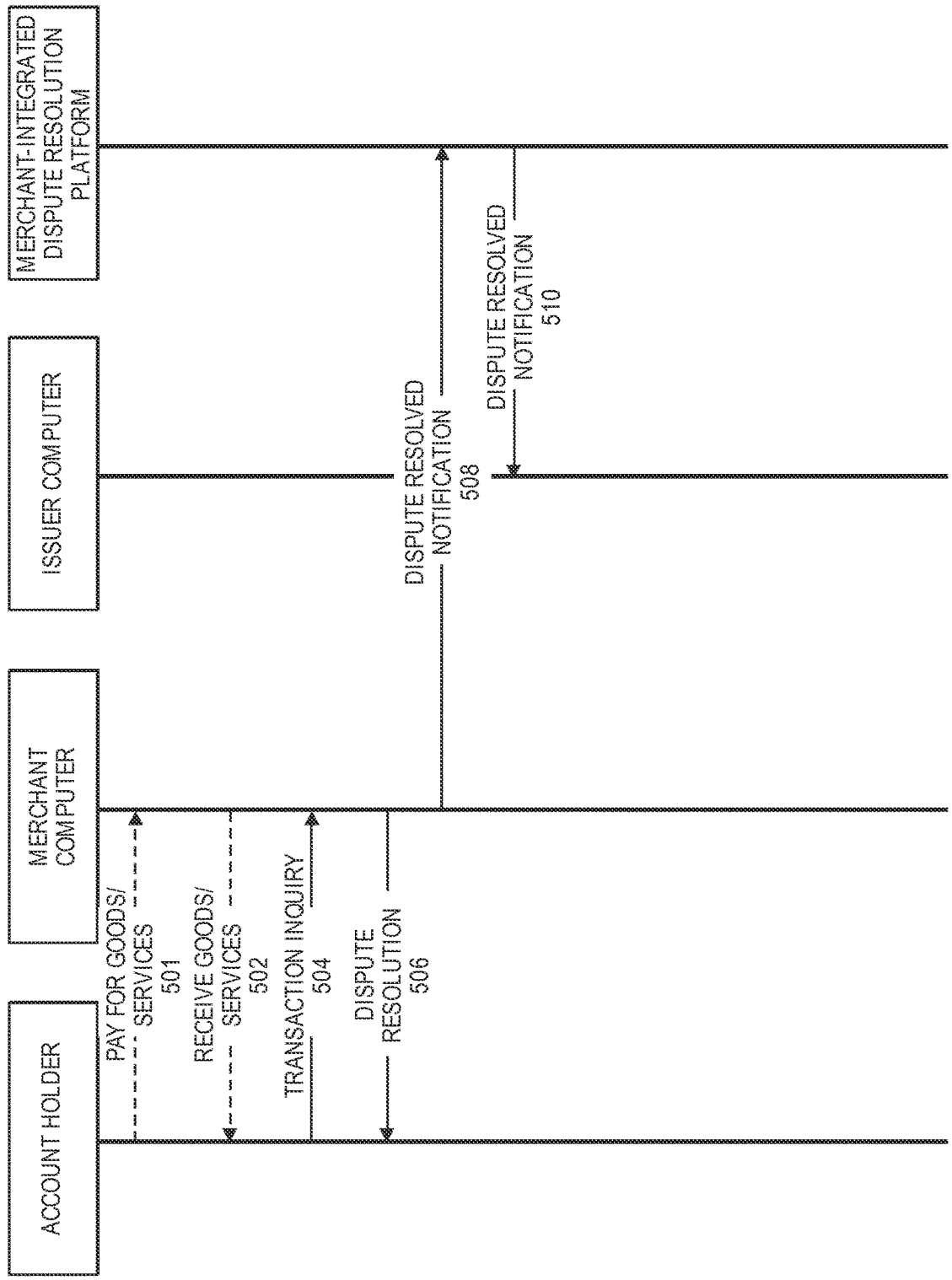
FIG. 8 illustrates a merchant-provided dispute resolution flow using a merchant integrated dispute resolution system, in accordance with an embodiment of the present invention.

In a dispute resolution process, it is desirable for a party to the dispute are notified about other parties' actions. For example, it is beneficial for the issuer to be aware of any dispute resolution solutions provided by the merchant so that the account holder is not credited twice for the disputed transaction. FIG. 8 illustrates a dispute resolution flow where the merchant integrated dispute resolution platform is used to pass information between the merchant and the issuer regarding the dispute resolution steps taken by the merchant.

FIG. 8 illustrates a merchant-provided dispute resolution flow using a merchant integrated dispute resolution system, in accordance with an embodiment of the present invention. As shown in FIG. 8, the account holder may conduct a transaction at the merchant (step 501) and receive goods/services (e.g., ship goods, provide digital downloads, allow online access, etc.) provided by the merchant (step 502). The account holder may not be satisfied with the quality of the goods/services or the account holder may have questions regarding the transaction. Thus, at step 504, the account holder may contact the merchant to inquire about the transaction. Alternatively, a fraudster posing like the account holder may conduct the transaction and receive goods/services provided by the merchant. Accordingly, at step 504, the account holder may contact the merchant to inquire about the transaction, (e.g. the account holder may contact the merchant to inquire about a charge appearing on their account statement). At step 506, the merchant can resolve the dispute with the account holder, for example by providing a refund, store credit, etc. At step 508, the merchant may send a dispute resolved notification to the merchant integrated dispute resolution platform. The dispute resolved notification may include the steps taken by the merchant to address and/or resolve the dispute initiated by the account holder directly with the merchant. At step 510, the merchant integrated dispute resolution platform may notify the issuer of the steps taken by the merchant to address the dispute with the account holder by sending the dispute resolved notification to the user (i.e. the merchant integrated dispute resolution platform may push the dispute resolved notification to the user). Alternatively, instead of the merchant integrated dispute resolution platform sending the dispute resolved notification to the issuer, the issuer may contact the merchant integrated dispute resolution platform to retrieve the merchant resolution details if the account holder later contacts the issuer to dispute the transaction with the issuer (i.e. the issuer pulls the dispute resolved notification from the merchant integrated dispute resolution platform). This prevents the account holder from being refunded twice: first through the merchant, and second through a chargeback or other disputed charge through their issuer.

All communications illustrated in FIG. 8 between the account holder, the issuer, the merchant integrated dispute resolution platform and the merchant (starting with the transaction inquiry at step 504 and ending with the merchant response being provided to the account holder at step 510) may occur in a single communication session. This may be referred as a sessionless communication or a sessionless call. According to some embodiments, the issuer may receive notification about merchant dispute resolution steps in about 10 seconds after the account holder contacts the merchant to inquire about the transaction at step 504.

Figure 9:
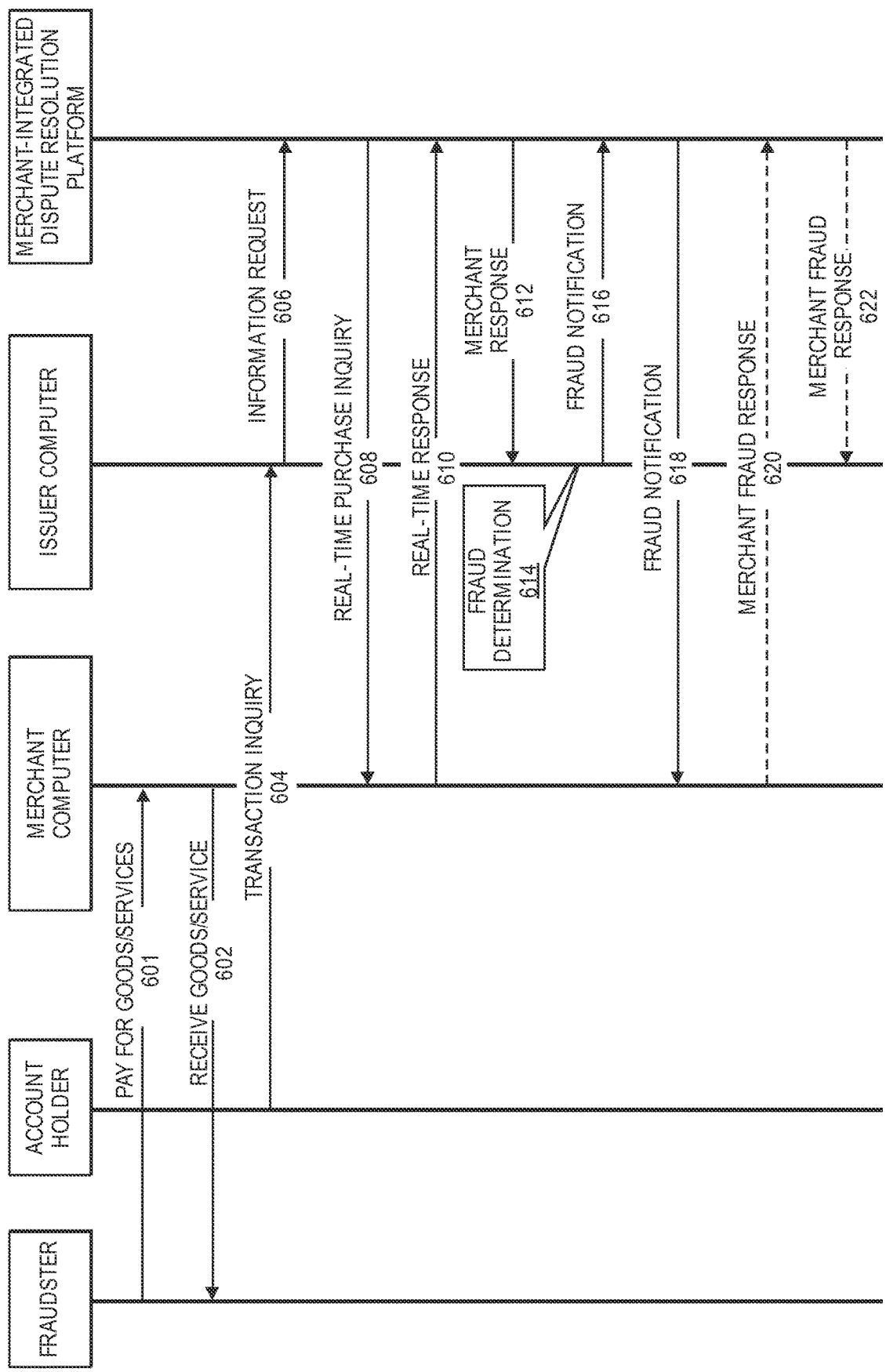
FIG. 9 illustrates a issuer-detected fraud notification flow using a merchant integrated dispute resolution system, in accordance with an embodiment of the present invention.

FIG. 9 illustrates a issuer-detected fraud notification flow using a merchant integrated dispute resolution system, in accordance with an embodiment of the present invention. At step 601, a fraudster can conduct a transaction with a merchant by paying for goods or services sold by the merchant using an account of the account holder. At step 602, the merchant can provide the fraudster with the purchased goods/services without realizing that the transaction is fraudulent. Upon realizing suspicious activity (i.e. the unauthorized transaction) posted on their account, the account holder can inquire about the transaction with their issuer at step 604. At step 606, the issuer can send a transaction information request message to a merchant integrated dispute resolution platform regarding the transaction. The transaction information request message may include account holder provided information about the transaction. For example, the transaction information request message may include a merchant identifier, a time and place of the transaction, an amount of the transaction, an identifier of the account holder, etc. Using the merchant identifier, the merchant integrated dispute resolution platform may determine that the transaction was conducted at a merchant who is registered with the merchant dispute resolution platform. Accordingly, at step 608, the merchant integrated dispute resolution platform can automatically generate a real-time purchase inquiry. For example, the merchant integrated dispute resolution platform may generate an API call to a merchant specified URL to send the real-time purchase inquiry to the merchant.

Upon receipt of the inquiry, the merchant may query its databases or storage locations to locate the transaction and associated details. At step 610, the merchant integrated dispute resolution platform can receive a real-time purchase response from the merchant. In some embodiments, the response can be formatted according to a schema published by the merchant integrated dispute resolution platform. The merchant integrated dispute resolution platform may reformat the response received from the merchant as needed to be viewed by the issuer. At step 612, the merchant integrated dispute resolution platform may provide the merchant's response to the issuer. Based on the response provided by the merchant, at step 614, the issuer may determine that the transaction is fraudulent. The issuer may or may not interact with the account holder to determine that the transaction was fraudulent. The issuer may send a fraud notification to the merchant integrated dispute resolution platform at step 616. The issuer may also send a stop recurring payment notification, exception file notification (providing an exception file listing), new account details to replace out of date account details previously affected by the fraud to the merchant in real-time. The merchant integrated dispute resolution platform may send the fraud notification (and any other notification provided by the issuer such as the stop recurring payment notification, exception file notification, new account details to replace out of date account details previously affected by the fraud) to the merchant in real-time at step 618. In some embodiments, the merchant integrated dispute resolution platform may format the fraud notification prior sending the notification to the merchant. Optionally, at step 620, the merchant may send a fraud response message to the merchant integrated dispute resolution platform to inform the parties of the steps taken by the merchant in response to the fraud notification. For example, the merchant may stop shipment of goods upon being notified of fraud. If such response is provided by the merchant, the merchant integrated dispute resolution platform may forward the merchant's fraud response to the issuer at step 622. In some embodiments, the merchant integrated dispute resolution platform may format the merchant's fraud response prior to sending it to the issuer.

All communications illustrated in FIG. 9 between the account holder, the issuer, the merchant integrated dispute resolution platform and the merchant (starting with the transaction inquiry at step 604 and ending with the merchant response being provided to the issuer at step 622) may occur in a single communication session. This may be referred as a sessionless communication or a sessionless call. According to some embodiments, the merchant may be notified of a fraudulent transaction identified by the issuer in about 10 second after the account holder inquires about the transaction with the merchant.

Embodiments provide a system that enables real-time communication between the issuer and the merchant during a transaction dispute. The merchant integrated dispute resolution platform discussed above according to various embodiments may establish a secure communication channel with the merchant to obtain item-level details about a transaction questioned by an account holder. The merchant integrated dispute resolution platform may provide a response to a transaction inquiry in about 10 seconds. This is a major improvement over current dispute resolution systems that take about 60-90 days to resolve a dispute. Moreover, by providing communication link between the issuers and the merchants, the merchant integrated dispute resolution platform allow parties to be fully informed about the details of the transaction. Accordingly, an account holder is prevented from receiving double refund once from the issuer and once from the merchant.

In some embodiments, the issuer and/or the merchant may be connected to the merchant integrated dispute resolution platform via a processor or service provider. For example, a payment processing network may manage a call center and interface with the dispute resolution platform on behalf of the issuer, and an acquirer or merchant service provider may interface with the dispute resolution platform on behalf of the merchant.

Exemplary Computer System

Figure 10:
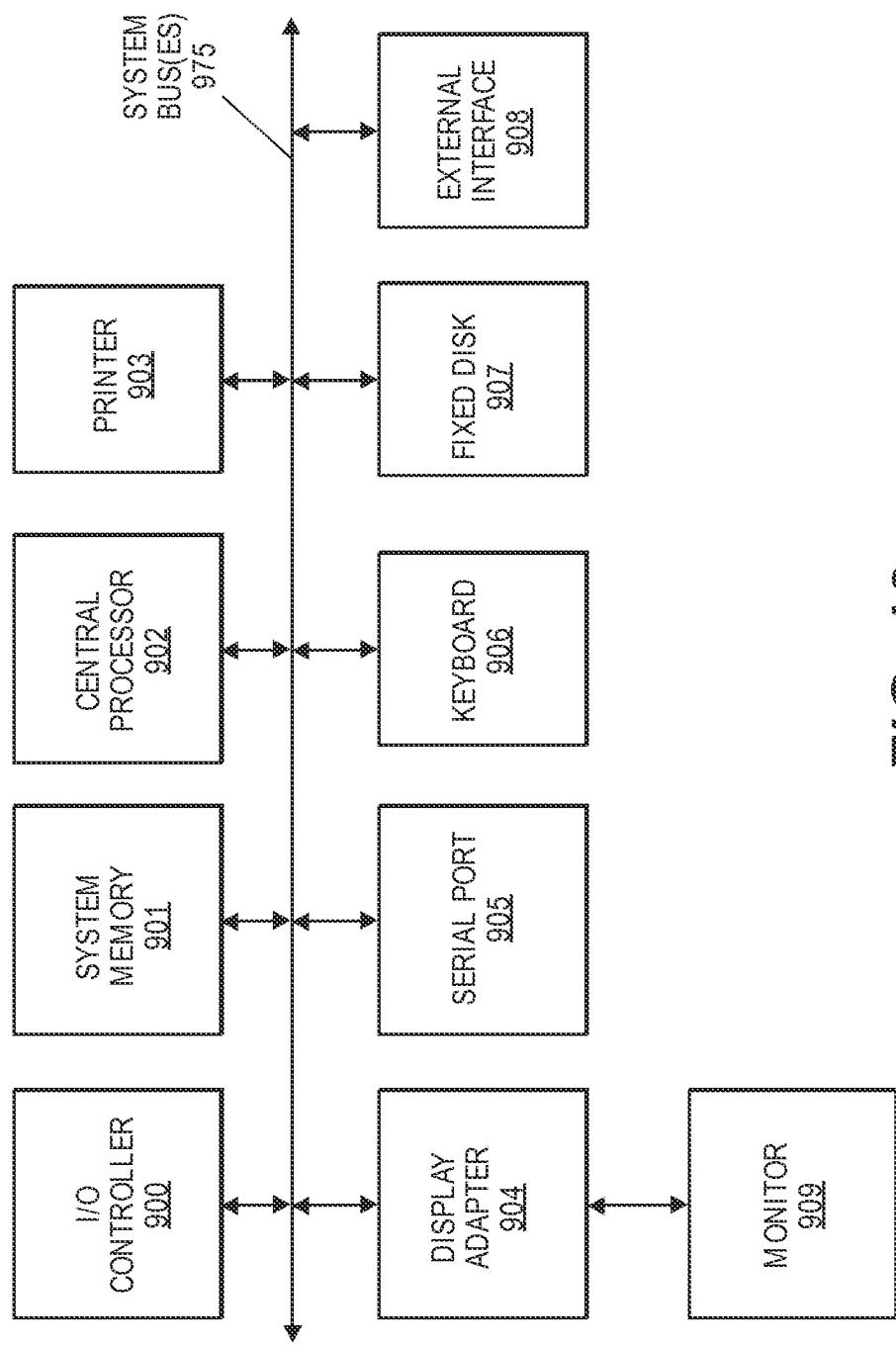
FIG. 10 illustrates a high level block diagram of a computer system that may be used to implement embodiments of the invention.

FIG. 10 illustrates a high level block diagram of a computer system that may be used to implement any of the entities or components described above. The subsystems shown in FIG. 10 are interconnected via a system bus 975. Additional subsystems include a printer 903, keyboard 906, fixed disk 907, and monitor 909, which is coupled to display adapter 904. Peripherals and input/output (I/O) devices, which couple to I/O controller 900, can be connected to the computer system by any number of means known in the art, such as a serial port. For example, serial port 905 or external interface 908 can be used to connect the computer apparatus to a wide area network such as the Internet, a mouse input device, or a scanner. The interconnection via system bus 975 allows the central processor 902 to communicate with each subsystem and to control the execution of instructions from system memory 901 or the fixed disk 907, as well as the exchange of data between subsystems. The system memory 901 and/or the fixed disk 907 may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of data such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired data and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a processor of a merchant integrated dispute resolution platform, a transaction inquiry message for a transaction from an issuer, wherein the transaction inquiry message includes transaction information received from an account holder, wherein receiving the transaction inquiry message starts a communication session;
   analyzing, by the processor of the merchant integrated dispute resolution platform, the transaction information to identify a merchant associated with the transaction;
   identifying, by the processor of the merchant integrated dispute resolution platform, the merchant associated with the transaction based on the analyzing;
   automatically generating, by the processor of the merchant integrated dispute resolution platform, a real-time purchase inquiry message;
   establishing, by the processor of the merchant integrated dispute resolution platform, a secure communication channel with the merchant;
   sending, by the processor of the merchant integrated dispute resolution platform, the real-time purchase inquiry message to the merchant via the secure communication channel using an application programming interface for the merchant; and
   receiving, by the processor of the merchant integrated dispute resolution platform, a real-time response from the merchant as part of the communication session started with receipt of the transaction inquiry message, wherein the real-time response includes purchase details associated with the transaction.

2. The method of claim 1, wherein the real-time response includes dispute resolution instructions.

3. The method of claim 1, further comprising:
   formatting the real-time purchase inquiry message according to a schema prior to sending the real-time purchase inquiry message to the merchant.

4. The method of claim 1, further comprising:
   formatting the real-time response according to a schema, the formatted real-time response including dispute resolution actions taken by the merchant; and
   sending the formatted real-time response to the issuer.

5. The method of claim 1, wherein the identifying further comprises:
   determining a merchant identifier among the transaction information based on the analyzing;
   searching a registered merchant database storing identifying information about a plurality of merchants registered with the merchant integrated dispute resolution platform;
   determining a match for the merchant identifier in the registered merchant database;
   retrieving credentials associated with the merchant based on the match; and
   establishing the secure communication channel with the merchant by providing the credentials.

6. The method of claim 1, wherein the transaction information in the transaction inquiry message are received from the account holder of an account used for payment for the transaction.

7. The method of claim 1, wherein the purchase details include delivery information.

8. The method of claim 1, further comprising, after receiving the real-time response from the merchant:
   receiving a notification from the issuer identifying the transaction as a fraudulent transaction;
   generating a real-time fraudulent transaction notification;
   sending the real-time fraudulent transaction notification to the merchant; and
   receiving a subsequent real-time response from the merchant as part of the communication session, the real-time response indicating steps taken by the merchant in connection with the fraudulent transaction.

9. The method of claim 1, further comprising, after receiving the real-time response from the merchant:
   receiving a real-time notification from the issuer indicating account holder intent to dispute the transaction;
   generating a real-time dispute intent notification;
   sending the real-time dispute intent notification to the merchant; and
   receiving a subsequent real-time response from the merchant as part of the communication session, the real-time response indicating dispute resolution options.

10. The method of claim 1, further comprising, after receiving the real-time response from the merchant:
    receiving a real-time notification from the issuer identifying the transaction as an exception event;
    generating a real-time exception event notification;
    sending the real-time exception event notification to the merchant; and
    receiving a subsequent real-time response from the merchant as part of the communication session, the real-time response indicating steps taken by the merchant in connection with the real-time exception event notification.

11. The method of claim 10, wherein the real-time exception event notification includes one or more of an exception file listing including a list of payment account numbers that have been compromised, an instruction to stop recurring payments and updated payment account details.

12. The method of claim 1, wherein the communication session takes 10 seconds or less.

13. A server computer comprising:
a processor; and
a computer readable medium coupled to the processor, the computer readable medium comprising code, executable by the processor, to implement a method comprising:
receiving a transaction inquiry message for a transaction from an issuer, wherein the transaction inquiry message includes transaction information received from an account holder, wherein receiving the transaction inquiry message starts a communication session;
analyzing the transaction information to identify a merchant associated with the transaction;
identifying the merchant associated with the transaction based on the analyzing;
automatically generating a real-time purchase inquiry message;
establishing a secure communication channel with the merchant;
sending the real-time purchase inquiry message to the merchant via the secure communication channel using an application programming interface for the merchant; and
receiving a real-time response from the merchant as part of the communication session started with receipt of the transaction inquiry message, wherein the real-time response includes purchase details associated with the transaction.

14. The server computer of claim 13, wherein the method further comprises, after receiving the real-time response from the merchant:
receiving a notification from the issuer identifying the transaction as a fraudulent transaction;
generating a real-time fraudulent transaction notification;
sending the real-time fraudulent transaction notification to the merchant; and
receiving a subsequent real-time response from the merchant as part of the communication session, the real-time response indicating steps taken by the merchant in connection with the fraudulent transaction.

15. The server computer of claim 13, wherein the method further comprises, after receiving the real-time response from the merchant:
receiving a real-time notification from the issuer indicating account holder intent to dispute the transaction;
generating a real-time dispute intent notification;
sending the real-time dispute intent notification to the merchant; and
receiving a subsequent real-time response from the merchant as part of the communication session, the real-time response indicating dispute resolution options.

16. The server computer of claim 13, wherein the method further comprises, after receiving the real-time response from the merchant:
receiving a real-time notification from the issuer identifying the transaction as an exception event;
generating a real-time exception event notification;
sending the real-time exception event notification to the merchant; and
receiving a subsequent real-time response from the merchant as part of the communication session, the real-time response indicating steps taken by the merchant in connection with the real-time exception event notification.

* * * * *